Dec. 27, 1955   J. R. O'NEIL   2,728,150
TIME-TELLING DEVICE
Filed Aug. 3, 1953
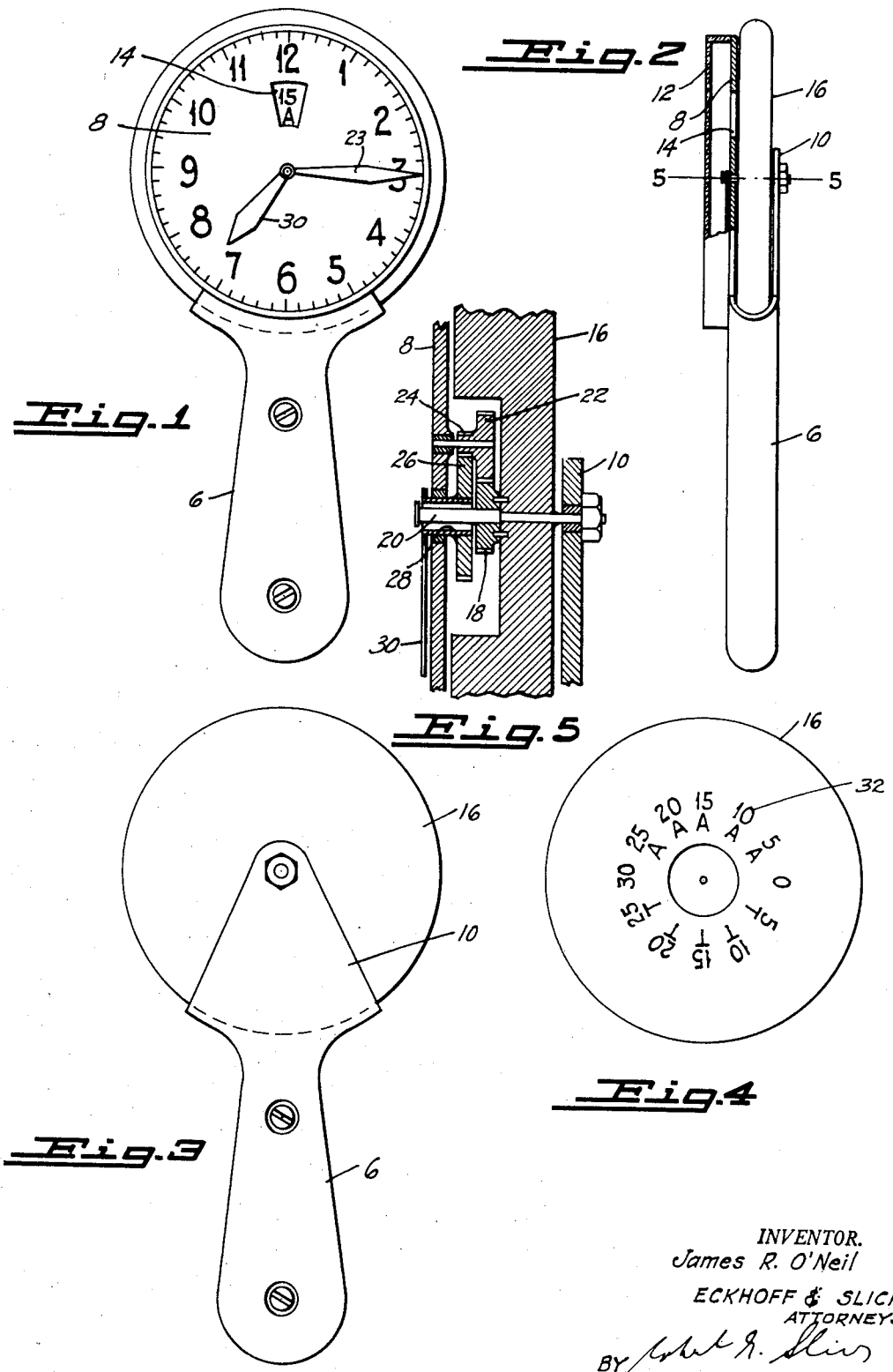
INVENTOR.
James R. O'Neil
ECKHOFF & SLICK
ATTORNEYS
BY
A MEMBER OF THE FIRM

United States Patent Office 2,728,150
Patented Dec. 27, 1955

2,728,150

TIME-TELLING DEVICE

James R. O'Neil, San Francisco, Calif.

Application August 3, 1953, Serial No. 371,770

2 Claims. (Cl. 35—39)

This invention relates to an educational device for teaching a child the correct reading of clock hands in relation to a clock dial.

It is in general the broad object of the present invention to provide an improved educational device which can be used to teach a child to tell time.

Another object of this invention is to provide an educational device simulating a clock wherein the hands can be changed readily to various haphazard positions.

Still another object of this invention is to provide an improved construction of a simulated clock wherein the hands can be easily moved, as by a child.

The invention includes other objects and features of advantage, some of which, together with the foregoing, will be described hereinafter wherein the preferred form of the educational device is disclosed.

In the drawings:

Figure 1 is a plan view of the device of the present invention.

Figure 2 is a side elevation, partially in section, of the device of Figure 1.

Figure 3 is a rear plan view of the device of Figure 1.

Figure 4 is a plan view of the flywheel portion of the device of the present invention.

Figure 5 is a sectional view on the line 5—5 of Figure 2.

Referring now to the drawings by reference characters, the device includes a handle adapted to be grasped in the hand, generally indicated at 6. The handle portion 6 has attached thereto a front or dial portion 8 and a rear bearing member 10. The dial 8 preferably has a transparent covering 12 over the dial to protect it. The dial portion 8 is provided with conventional clock indicia, as is shown in Figure 1 and, in addition, has an aperture 14 therein, for a purpose hereinafter described. Mounted for rotation between the dial 8 and the rear support member 10 is a flywheel member 16. It will be noted that the flywheel 16 extends beyond the dial 8 so that the flywheel 16 may be rotated by stroking any portion of it, with the exception of the small portion obscured by the handle 6. The flywheel portion 16 serves to drive the clock hands in the following manner. Fastened to the flywheel 16 is a spur gear 18 and a shaft 20. The minute hand 23 is fastened to the shaft 20 and rotates therewith so that the minute hand 23 rotates at the same speed as the flywheel 16. The spur gear 18 drives an idler gear 22, which has attached thereto a smaller gear 24, which turns gear 26; gear 26 is keyed to hollow shaft 28. The hollow shaft 28 has attached thereto the hour hand 30. The gears thus described have a 12-to-1 ratio so that for each twelve revolutions of the flywheel and minute hand, the hour hand 30 makes one revolution. The flywheel 16 has numbers and letters marked thereon as at 32, which show through the aperture 14. Since the flywheel 16 moves in timed relationship to the minute hand 23, the indicia shown through the aperture 14 indicates the position of the minute hand. For instance, in the position shown in Figure 1, the clock is pointing at 15 minutes after 7, and through the aperture 14, one can see the numeral 15 followed by the letter "A," showing that the minute hand 23 is at 15 minutes after the hour. It is obvious that other suitable indicia may be used. For instance, all of the indications could be in minutes after the hour rather than minutes both after and before the hour, as illustrated. In this manner, the child is readily taught to interpret correctly the position of the hands of the clock.

I claim:

1. An educational device for teaching the correct reading of clock hands in relation to a clock dial comprising a clock dial marked in hours, an hour hand, and a minute hand movable over the dial, gearing connecting the hour and minute hands for movement over the dial in the usual relation of hour and minute hands, a support for said device, and means for rotating the gearing and the hands for free rotation over the dial, said means including a flywheel concentric with and behind the clock dial, said flywheel having a larger circumference than the dial and thus having a periphery extending beyond the periphery of said dial, said support having a reduced portion exposing a substantial part of the flywheel whereby said flywheel can be readily contacted by the hands of a user for spinning the flywheel and rotating the clock hands to a haphazard position.

2. The educational device of claim 1 wherein the dial has an aperture therein and the flywheel has indicia thereon showing through said aperture to indicate the position of the minute hand of the clock.

References Cited in the file of this patent

UNITED STATES PATENTS

| 676,807 | Weston | June 18, 1901 |
| 1,143,519 | Edmiston | June 15, 1915 |
| 1,634,197 | Kent | June 28, 1927 |
| 2,539,025 | Lobb | Jan. 23, 1951 |

FOREIGN PATENTS

| 15,951 | Great Britain | Aug. 24, 1895 |